United States Patent
Ogusa et al.

(10) Patent No.: US 9,096,166 B2
(45) Date of Patent: Aug. 4, 2015

(54) TERMINAL DEVICE

(75) Inventors: Kyouichi Ogusa, Matsue (JP);
Fuminori Takama, Moriguchi (JP)

(73) Assignee: SANYO TECHNO SOLUTIONS TOTTORI CO., LTD., Tottori (JP)

(*) Notice: Subject to any disclaimer, the term of this patent is extended or adjusted under 35 U.S.C. 154(b) by 16 days.

(21) Appl. No.: 14/006,844

(22) PCT Filed: Sep. 12, 2011

(86) PCT No.: PCT/JP2011/070704
§ 371 (c)(1),
(2), (4) Date: Sep. 23, 2013

(87) PCT Pub. No.: WO2012/127713
PCT Pub. Date: Sep. 27, 2012

(65) Prior Publication Data
US 2014/0015660 A1   Jan. 16, 2014

(30) Foreign Application Priority Data
Mar. 23, 2011   (JP) .................. 2011-063863

(51) Int. Cl.
*B60Q 1/00* (2006.01)
*B60Q 9/00* (2006.01)
(Continued)

(52) U.S. Cl.
CPC .............. *B60Q 9/008* (2013.01); *G08G 1/093* (2013.01); *G08G 1/163* (2013.01); *H04W 4/021* (2013.01); *H04W 4/046* (2013.01); *H04W 64/00* (2013.01); *G08G 1/166* (2013.01); *H04W 74/0808* (2013.01)

(58) Field of Classification Search
CPC .... H04L 12/413; H04W 84/12; H04W 84/18; H04W 74/0808; H04W 74/0816; H04W 4/021; H04W 4/046; H04W 64/00; B60Q 9/008; G08G 1/093; G08G 1/163
USPC .......... 340/435, 903; 370/445, 447, 448, 310, 370/277
See application file for complete search history.

(56) References Cited

U.S. PATENT DOCUMENTS

2009/0154436 A1* 6/2009 Choi et al. .................... 370/338
2009/0296680 A1* 12/2009 Suzuki et al. ................. 370/342
(Continued)

FOREIGN PATENT DOCUMENTS

JP   2005-202913 A   7/2005
JP   2008-271477 A   11/2008
JP   2010-252073 A   11/2010

OTHER PUBLICATIONS

International Search Report in PCT/JP2011/070704 dated Oct. 4, 2011 with English Translation.

*Primary Examiner* — Thomas Mullen
(74) *Attorney, Agent, or Firm* — McDermott Will & Emery LLP

(57) ABSTRACT

An acquisition unit determines the location of an object. A setting unit sets a wait time if the determined location satisfies predetermined conditions. The range of wait time that the setting unit can set is narrower than the range of wait time that can be set by other kinds of terminal devices capable of broadcasting packet signals by means of carrier sensing. A carrier sense unit performs a carrier sense over the set wait time. A modulator-demodulator unit and RF unit broadcast a packet signal together with the results of the carrier sense.

6 Claims, 11 Drawing Sheets

(51) Int. Cl.
*H04W 4/02* (2009.01)
*H04W 64/00* (2009.01)
*H04W 4/04* (2009.01)
*G08G 1/09* (2006.01)
*G08G 1/16* (2006.01)
*H04W 74/08* (2009.01)

(56) References Cited

U.S. PATENT DOCUMENTS

2013/0163548 A1* 6/2013 Nagai et al. .................. 370/329
2013/0322368 A1* 12/2013 Nagai et al. .................. 370/329

* cited by examiner

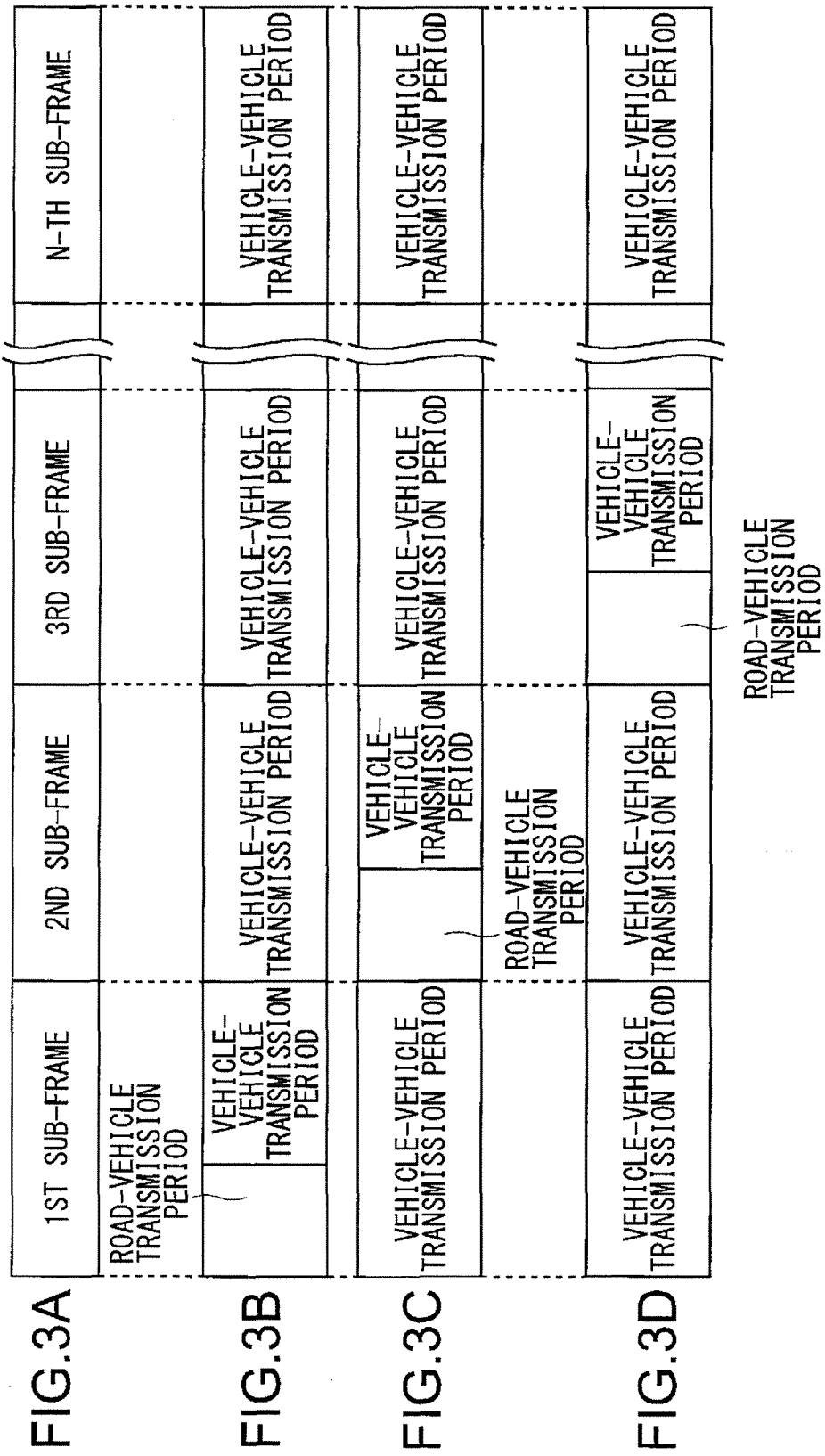

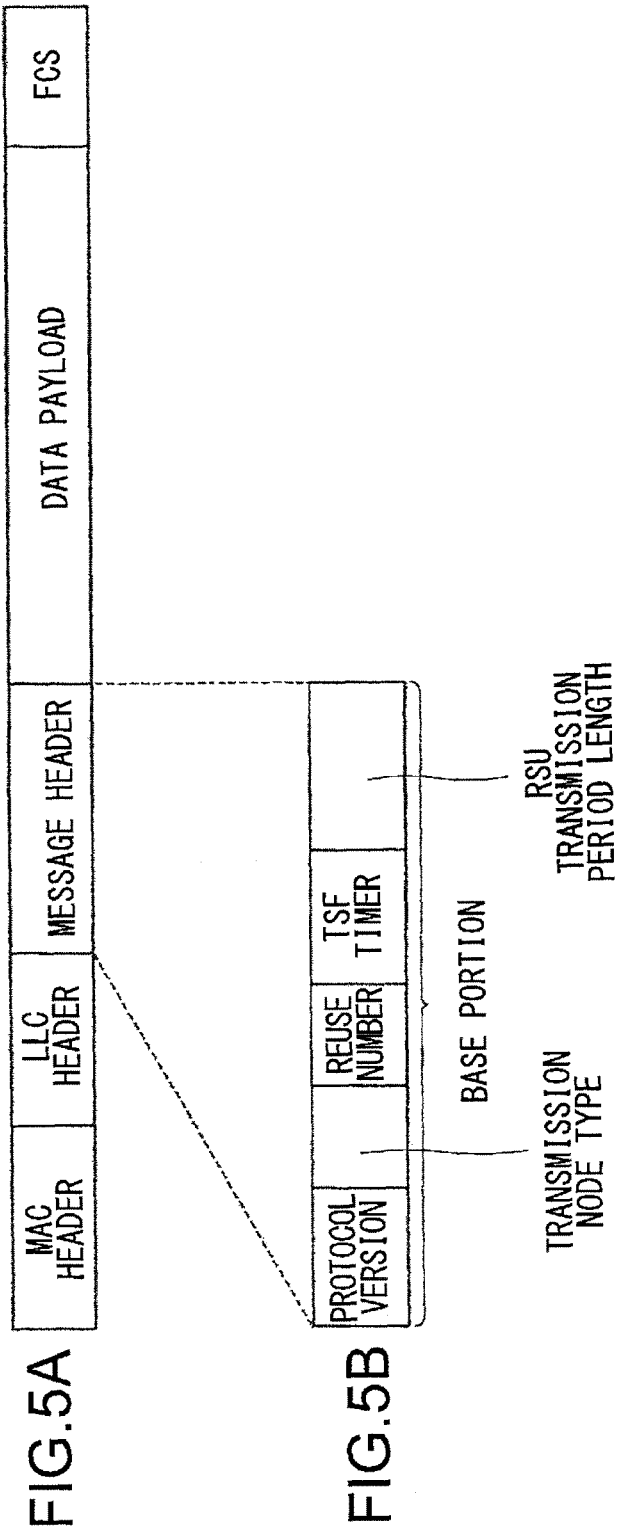

TERMINAL DEVICE

RELATED APPLICATIONS

This application is the U.S. National Phase under 35 U.S.C. §371 of International Application No. PCT/JP2011/070704, filed on Sept. 12, 2011, which in turn claims the benefit of Japanese Application No. 2011-063863, filed on Mar. 23, 2011, the disclosures of which Applications are incorporated by reference herein.

TECHNICAL FIELD

The present invention relates to a communication technology, more particularly, to a terminal device that outputs a signal which contains predetermined information.

BACKGROUND ART

To prevent a collision accident at an intersection, between-road-and-vehicle communication is under study. In the between-road-and-vehicle communication, information related to an intersection situation is communicated between a road-side device and a vehicle device. In the between-road-and-vehicle communication, installation of the road-side device is necessary, which requires much working and cost. In contrast to this, in between-vehicles communication, that is, in a form of communicating information between vehicle devices, the installation of the road-side device becomes unnecessary. In this case, for example, the current location information is detected by means of a GPS (Global Positioning System) and the like, and the location information is exchanged between the vehicle devices, whereby it is determined on which roads one vehicle and the other vehicle are situated to enter an intersection (e.g., see a patent document 1).

CITATION LIST

Patent Literature

PLT1: JP-A-2005-202913

SUMMARY OF INVENTION

Technical Problem

In a wireless LAN (Local Area Network) in conformity with standards such as the IEEE802.11 and the like, an access control function called CSMA/CA (Carrier Sense Multiple Access with Collision Avoidance) is used. Because of this, in the wireless LAN, the same wireless channel is shared with a plurality of terminal devices. In the CSMA/CA, it is confirmed by carrier sense that another packet signal is not transmitted, thereafter, a packet signal is transmitted. In a case where a wireless LAN is applied to the between-vehicles communication of an ITS (Intelligent Transport Systems) and the like, it is necessary to transmit information to a terminal device that is mounted in each of many unspecified vehicles, accordingly, it is desirable to transmit a signal in a broadcast manner. As a result of this, the terminal device receives the signal transmitted in the broadcast manner, detects an approach of another vehicle, notifies the driver of the approach, thereby urging the driver to take caution to prevent a collision accident between the vehicles.

It is desired not only to prevent a collision accident between vehicles but also to prevent a collision accident between a vehicle and a pedestrian and the like. To deal with this, the terminal device is also carried by other pedestrians. To prevent a pedestrian from being struck from behind by a vehicle, the terminal device carried by the pedestrian notifies the terminal device of the vehicle of the location where the pedestrian is situated. On the other hand, the terminal device carried by the pedestrian is driven by a battery, accordingly, it is needed to reduce a processing amount compared with the terminal device of the vehicle. For example, an approach of another vehicle is not notified to the pedestrian. Even in a case where the terminal device carried by the pedestrian transmits a packet signal in the broadcast manner, it is desirable that influence, which is given to a packet signal transmitted in the broadcast manner from the vehicle terminal device, is small. Besides, in light of the purpose that the pedestrian notifies their location, it is desirable that the terminal device carried by the pedestrian is able to output a packet signal more preferentially than the vehicle terminal device. However, if a packet signal is preferentially output constantly, the influence given to the vehicle terminal device is likely to become large.

The present invention has been made in light of this situation, and it is an object of the present invention to provide a technology that identifies timing for preferentially outputting a packet signal while reducing influence given to a packet signal output from another terminal device.

Solution to Problem

To solve the above issue, a terminal device according to the present invention includes: a positioning portion that positions a location of an object; a setting portion that sets a waiting time period in a case where the location positioned by the positioning portion meets a predetermined condition; a carrier sense portion that executes carrier sense for the waiting time period set by the setting portion; and an output portion that outputs a packet signal based on a result of the carrier sense by the carrier sense portion. A range of the waiting time period which the setting portion is able to set is narrower than a range of a waiting time period that another kind of terminal device, which is able to output the packet signal based on the carrier sense, is able to set.

In the meantime, an arbitrary combination of the above constituent components and exchanges of expressions of the present invention among a method, a device, a system, a recording medium, a computer program and the like are also effective as forms of the present invention.

Advantageous Effects of Invention

According to the present invention, it is possible to identify the timing for preferentially outputting a packet signal while reducing the influence given to a packet signal output from the other terminal device.

BRIEF DESCRIPTION OF DRAWINGS

FIG. 3A is a view showing a format of a frame defined in the communication system in FIG 1, FIG. 3B is a view showing a structure of a frame generated by a 1st base station device 10*a*, FIG. 3C is a view showing a structure of a frame generated by a 2nd base station device 10*b*, and FIG. 3D is a view showing a structure of a frame generated by a 3rd base station device 10*c*.

FIG. 5A is a view showing a format of a MAC frame contained in a packet signal defined in the communication system in FIG. 1, and FIG. 5B is a view showing a structure of a message header of the MAC frame contained in the packet signal defined in the communication system in FIG. 1.

DESCRIPTION OF EMBODIMENTS

Figure 1:
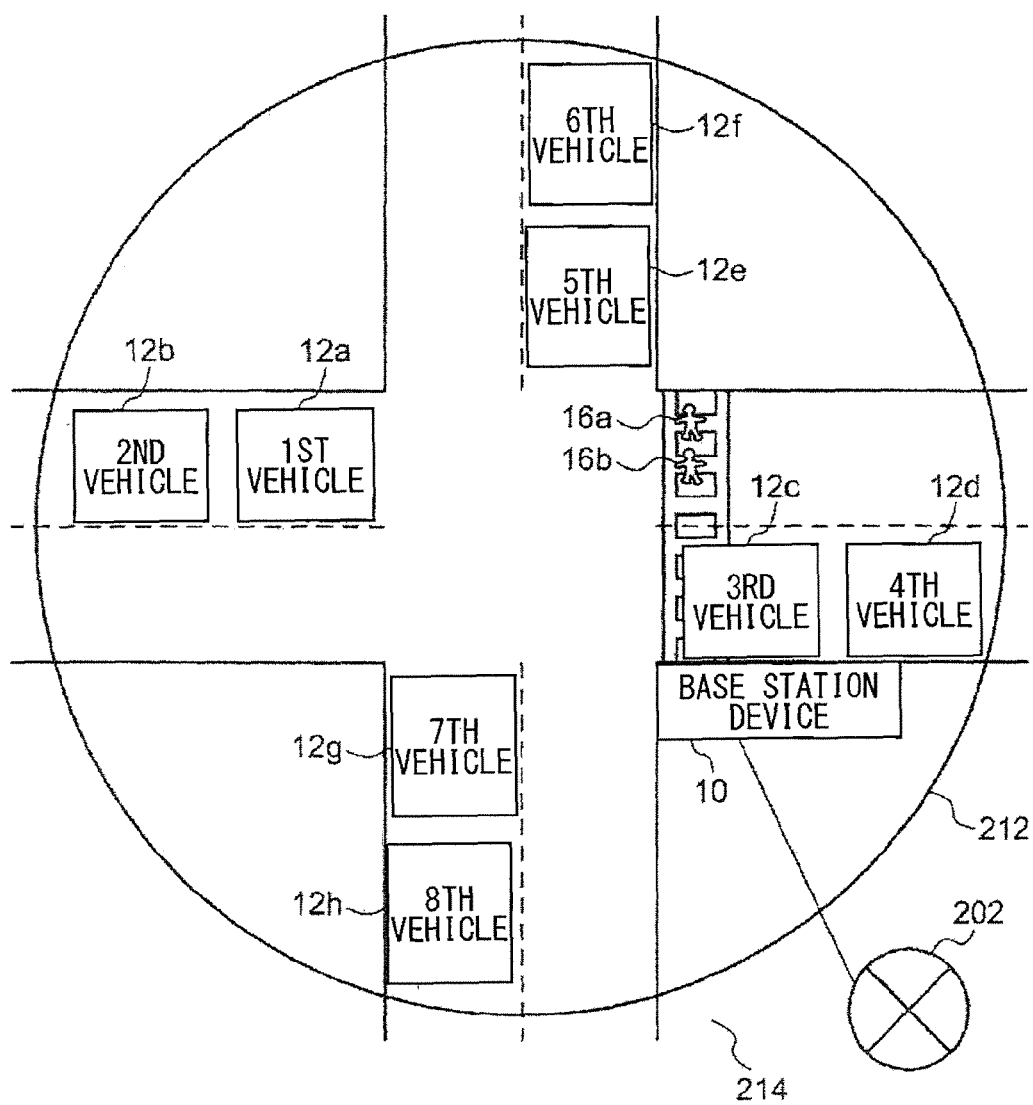
FIG. 1 is a view showing a structure of a communication system according to an embodiment of the present invention.

Before specifically describing the present invention, an overview is described. An embodiment of the present invention relates to a communication system that executes between-vehicles communication between terminal devices (hereinafter, called a "vehicle terminal device") mounted in vehicles and also executes between-road-and-vehicle communication from a base station device disposed at an intersection and the like to a vehicle terminal device. As the between-vehicles communication, the vehicle terminal device transmits a packet signal in a broadcast manner that contains information (hereinafter, called "data") of a speed, location and the like of the vehicle. Besides, another vehicle terminal device receives the packet signal and recognizes an approach and the like of a vehicle based on the data. The approach of a vehicle is notified to drivers, whereby the drivers are urged to take caution. To reduce interference of the between-vehicles communication and the between-road-and-vehicle communication, the base station device repeatedly defines a frame that contains a plurality of sub-frames. The base station device selects any one of the plurality of sub-frames for the between-road-and-vehicle communication, and transmits a packet signal, which contains control information and the like, in the broadcast manner during a period of a header portion of the selected sub-frame. The control information contains information related to a period (hereinafter, called a "road-vehicle transmission period") during which the base station device transmits the packet signal in the broadcast manner.

The vehicle terminal device identifies a road-vehicle transmission period based on the control information and transmits a packet signal during a period other than the road-vehicle transmission period. In this way, the between-road-and-vehicle communication and the between-vehicles communication are multiplexed in time division, accordingly, a likelihood of a packet signal collision between both is reduced. In the meantime, the between-vehicles communication is performed during a period (hereinafter, called a "vehicle-vehicle transmission period") for executing the between-vehicles communication other than the road-vehicle transmission period by means of a CSMA protocol. This terminal device is carried by a pedestrian as well (hereinafter, a terminal device carried by a pedestrian is called a "mobile terminal device."). The mobile terminal device is driven by a battery, and low electric power consumption is needed. Because of this, the mobile terminal device transmits only a packet signal containing the data in the broadcast manner, but does not notify the pedestrian of an approach of a vehicle.

Even in the case where the mobile terminal device transmits a packet signal in the broadcast manner, it is needed to reduce influence given to the packet signal that is transmitted in the broadcast manner from the vehicle terminal device. Besides, the purpose of the mobile terminal device transmitting the packet signal in the broadcast manner is to notify drivers of a location of the pedestrian. Because of this, it is desired that the mobile terminal device is able to perform the transmission more preferentially than the vehicle terminal device when necessary. To deal with this, the communication system according to the present embodiment executes the following process. In the meantime, hereinafter, even the mobile terminal device refers to the between-vehicles communication and the between-road-and-vehicle communication. Besides, there is a case where the "terminal device" is used without distinguishing the vehicle terminal device and the mobile terminal device from each other, and there is also a case where the vehicle terminal device and the mobile terminal device are collectively called the "terminal device."

Like the vehicle terminal device, the mobile terminal device also executes the CSMA protocol during the vehicle-vehicle transmission period. Here, the mobile terminal device is required to have electric power consumption lower than the vehicle terminal device, accordingly, an information amount transmitted in the broadcast manner from the mobile terminal device is made to be lesser than an information amount transmitted in the broadcast manner from the vehicle terminal device. As a result of this, a packet signal length of the former is set shorter than a packet signal length of the latter. In the CSMA protocol, the length of a contention window is variable, and carrier sense is executed during the period. Despite the short packet signal length, if the maximum value of the contention window is the same, a waiting time period for the packet signal length becomes long. To deal with this, the maximum value of the contention window in the mobile terminal device is defined to become shorter than the maximum value of the contention window in the vehicle terminal device. In the meantime, if such transmission is executed all the time, a transmission opportunity for the vehicle terminal device decreases. Because of this, a distance between the pedestrian and the vehicle is measured, and if the distance becomes smaller than a threshold value, the above transmission is executed.

FIG. 1 shows a structure of a communication system 100 according to the embodiment of the present invention. This shows one intersection viewed from top. The communication system 100 includes: a base station device 10; a 1st vehicle 12a, a 2nd vehicle 12b, a 3rd vehicle 12c, a 4th vehicle 12d, a 5th vehicle 12e, a 6th vehicle 12f, a 7th vehicle 12g, and an 8th vehicle 12h that are collectively called a vehicle 12; a 1st pedestrian 16a, and a 2nd pedestrian 16b who are collectively called a pedestrian 16. In the meantime, each vehicle 12 is provided with a not-shown vehicle terminal device, while each pedestrian 16 carries a not-shown mobile terminal device. Besides, an area 212 is formed around the base station terminal 10, and an area 214 is formed outside the area 212.

As shown in the figure, a road running in a horizontal direction of the figure, that is, a left-right direction and a road running in a vertical direction of the figure, that is, a top-bottom direction cross each other at a central portion. Here, the upper side of the figure corresponds to a "North" direction, the left side corresponds to a "West" direction, the lower side corresponds to a "South" direction, and the right side corresponds to a "East" direction. Besides, the crossing portion of the two roads is an "intersection." The 1st vehicle 12a and the 2nd vehicle 12b are traveling from left to right, while the 3rd vehicle 12c and the 4th vehicle 12d are traveling from right to left. Besides, the 5th vehicle 12e and the 6th vehicle 12f are traveling from top to bottom, while the 7th vehicle 12g and the 8th vehicle 12h are traveling from bottom to top.

The base station device 10 controls the communication between the terminal devices. Based on a signal received from a GPS satellite (not shown) and a frame formed in the other base station device 10, the base station device 10 repeatedly generates a frame that contains a plurality of sub-frames. Here, definition is performed such that a road-vehicle transmission period is able to be set into the header portion of each sub-frame. From the plurality of sub-frames, the base station device 10 selects a sub-frame in which a road-vehicle transmission period is not set by another base station device 10. The base station device 10 sets a road-vehicle transmission period into the header portion of the selected sub-frame. The base station device 10 outputs a packet signal during the set road-vehicle transmission period.

The vehicle 12 is driven by an engine and incorporates a vehicle terminal device. Based on the control information contained in a received packet signal, the vehicle terminal device generates a frame. As a result of this, the frame generated by each of the plurality of vehicle terminal devices synchronizes with the frame generated by the base station device 10. Besides, the vehicle terminal device executes the CSMA/CA during the vehicle-vehicle transmission period to output the packet signal. The vehicle terminal device sets, for example, information related to a location into the packet signal. Besides, the vehicle terminal device sets the control information as well into the packet signal. In other words, the control information transmitted from the base station device 10 is transferred by the vehicle terminal device.

On the other hand, a vehicle terminal device that is not able to receive the packet signal from the base station device 10, that is, a vehicle terminal device situated outside the area 214 executes the CSMA/CA irrespective of a frame structure to output a packet signal. Further, the vehicle terminal device receives a packet signal from another vehicle terminal device to notify the driver of an approach of the vehicle in which the other vehicle terminal device is mounted.

The pedestrian 16 carries a mobile terminal device. The mobile terminal device executes a process similar to the vehicle terminal device. However, to facilitate the process, the mobile terminal device does not notify approaches of a vehicle and the like. Here, the mobile terminal device acquires its own location, and upon receiving the packet signal from the vehicle terminal device, acquires the location of the vehicle as well. If the distance between its own location and the location of the vehicle is smaller than the threshold value, the mobile terminal device sets a contention window such that an average waiting time period when executing the CSMA/CA becomes shorter than an average waiting time period in the vehicle terminal device. On the other hand, if the distance is equal to the threshold value or more, the mobile terminal device sets a contention window like the vehicle terminal device. In the meantime, transmission electric power for the mobile terminal device is set to become lower than transmission electric power for the other device.

Figure 2:
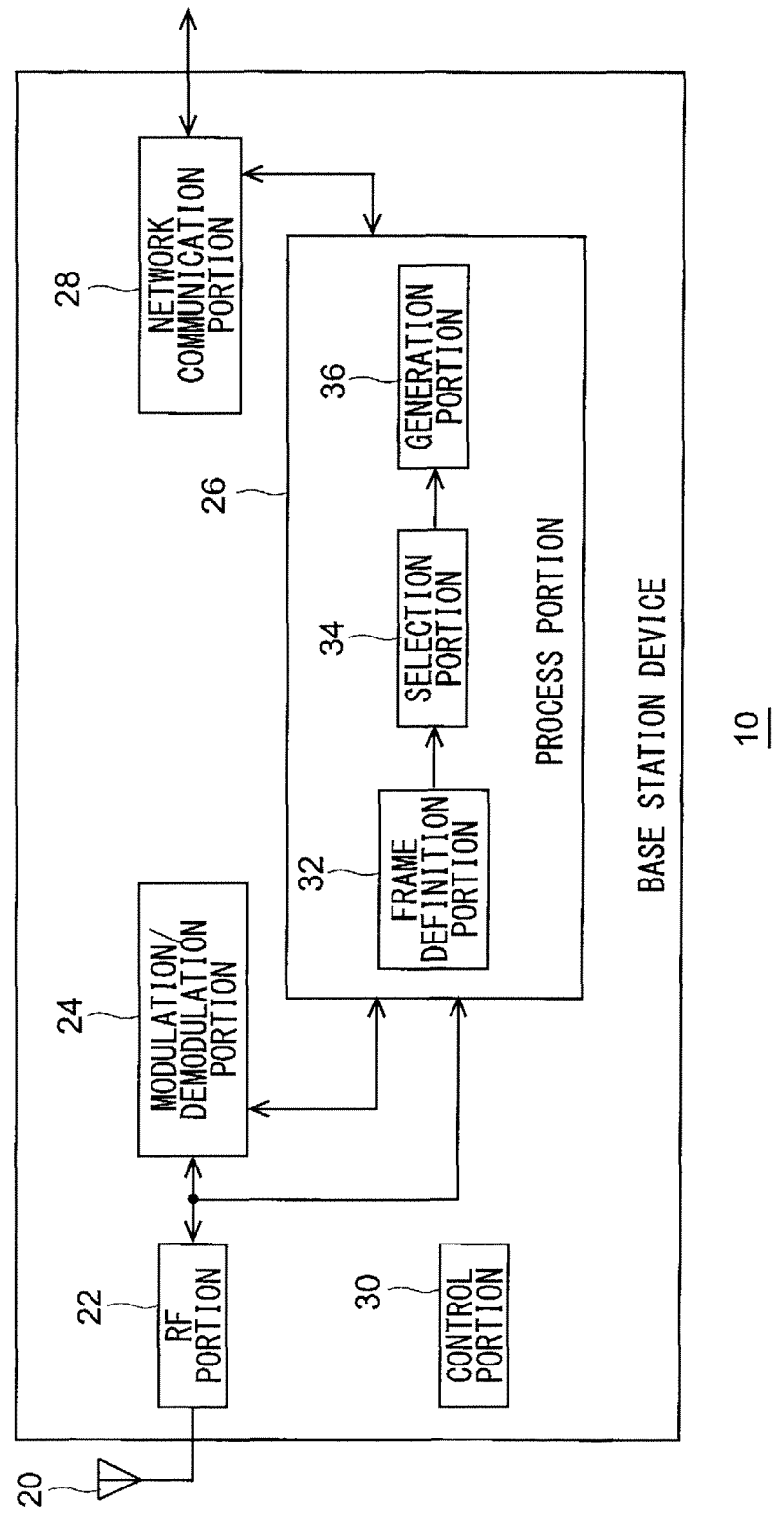
FIG. 2 is a view showing a structure of a base station device in FIG. 1.

FIG. 2 shows a structure of the base station device 10. The base station device 10 includes: an antenna 20; a RF portion 22; a modulation/demodulation portion 24; a process portion 26; a network communication portion 28; and a control portion 30. The process portion 26 includes: a frame definition portion 32; a selection portion 34; and a generation portion 36.

As a reception process, the RF portion 22 receives packet signals from a not-shown terminal device and another base station device 10 by means of the antenna 20. The RF portion 22 applies frequency conversion to the received packet signal having a radio frequency to generate a base band packet signal. Further, the RF portion 22 outputs the base band packet signal to the modulation/demodulation portion 24. Generally, the base band packet signal is formed of an in-phase component and an orthogonal component, accordingly, two signal lines should be shown; however, here, for the sake of making the figure clear, only one signal line is shown. The RF portion 22 further includes: a LNA (Low Noise Amplifier); a mixer; an AGC; and an A/D conversion portion.

As a transmission process, the RF portion 22 applies the frequency conversion to the base band packet signal input from the modulation/demodulation portion 24 to generate a radio frequency packet signal. Further, the RF portion 22 transmits the radio frequency packet signal from the antenna 20 during the road-vehicle transmission period. Besides, the RF portion 22 further also includes: a PA (Power Amplifier); a mixer; and an D/A conversion portion.

As a reception process, the modulation/demodulation 24 applies demodulation to the base band packet signal from the RF portion 22. Further, the modulation/demodulation 24 outputs the demodulation result to the process portion 26. Besides, as a transmission process, the modulation/demodulation 24 applies modulation to the data from the process portion 26. Further, the modulation/demodulation 24 outputs the modulation result as a base band packet signal to the RF portion 22. Here, the communication system 100 is compatible with the OFDM (Orthogonal Frequency Division Multiplexing) modulation method, accordingly, the modulation/demodulation 24 executes also the FFT (Fast Fourier Transform) as the reception process and executes also the IFFT (Inverse Fast Fourier Transform) as the transmission process.

The frame definition portion 32 receives a signal from the not-shown GPS satellite and acquires time point information based on the received signal. In the meantime, a conventional technology may be used for the acquisition of the time point information, accordingly, here, description is skipped. Based on the time point information, the frame definition portion 32 generates a plurality of frames. For example, based on timing shown by the time point information, the frame definition portion 32 divides a period of "1 sec." into 10 segments to generate 10 frames of "100 msec." By repeating this process, the frame is defined repeatedly.

In the meantime, the frame definition portion 32 may detect the control information from a demodulation result to generate a frame based on the detected control information. This process corresponds to generating a frame that synchronizes with the timing of the frame formed by the other base station device 10. FIGS. 3A-3D show frame formats defined by the communication system 100. FIG. 3A shows a frame structure. The frame is formed of N sub-frames shown by a 1st sub-frame to an Nth sub-frame. For example, in a case where the frame length is 100 msec. and N is 8, sub-frames each having a length of 12.5 msec. are defined. FIGS. 3B-3D are described later.

In FIG. 2, the selection portion 34 selects, from the plurality of sub-frames contained in the frame, a sub-frame for setting the road-vehicle transmission period. Specifically, the selection portion 34 receives the frame defined by the frame definition portion 32. The selection portion 34 receives demodulation results from the not-shown other base station device 10 or terminal device via the RF portion 22 and the modulation/demodulation 24. The selection portion 34 extracts, from the received demodulation results, a demodulation result from the other base station device 10. The selection portion 34 identifies a sub-frame that receives the demodulation result to identify a sub-frame that does not receive the demodulation result. This corresponds to identifying a sub-frame in which the road-vehicle transmission period is not set by the other base station device 10, that is, an unused sub-frame. In a case where there are a plurality of unused sub-frames, the selection portion 34 selects one sub-frame at random. In a case where there are no unused sub-frames, that is, in a case where all of the plurality of sub-frames are used, the selection portion 34 acquires a reception electric power value that is the magnitude of electric power of a packet signal received by the RF portion 22 and demodulated by the modulation/demodulation portion 24 and preferentially selects a sub-frame that has a small reception electric power value.

FIG. 3B shows a structure of a frame generated by a 1st base station device 10a. The 1st base station device 10a sets a road-vehicle transmission period into a header portion of the 1st sub-frame. Besides, the 1st base station device 10a sets a vehicle-vehicle transmission period into the 1st sub-frame after the road-vehicle transmission period. The vehicle-vehicle transmission period is a period during which the vehicle terminal device is able to output the packet signal. In other words, definition is performed such that the 1st base station device 10a is able to output the packet signal during the road-vehicle transmission period that is a header period of the 1st sub-frame and the vehicle terminal device is able to output the packet signal during the vehicle-vehicle transmission period rather than the road-vehicle transmission period. Further, the 1st base station device 10a sets vehicle-vehicle transmission periods only into the 2nd sub-frame to the N-th sub-frame.

FIG. 3C shows a structure of a frame generated by a 2nd base station device 10b. The 2nd base station device 10b sets a road-vehicle transmission period into a header portion of the 2nd sub-frame. Besides, the 2nd base station device 10b sets vehicle-vehicle transmission periods into the 3rd sub-frame to the N-th sub-frame after the road-vehicle transmission periods in the 1st sub-frame and the 2nd sub-frame. FIG. 3D shows a structure of a frame generated by a 3rd base station device 10c. The 3rd base station device 10c sets a road-vehicle transmission period into a header portion of the 3rd sub-frame. Besides, the 3rd base station device 10c sets vehicle-vehicle transmission periods into the 4th sub-frame to the N-th sub-frame after the road-vehicle transmission periods in the 1st sub-frame, the 2nd sub-frame and the 3rd sub-frame. As described above, the plurality of base station devices 10 select the sub-frames different from one another and set the road-vehicle transmission period into the header portion of the selected sub-frame. Back to FIG. 2. The selection portion 34 outputs a number of the selected sub-frame to the generation portion 36.

The generation portion 36 sets a road-vehicle transmission period into the sub-frame that has the sub-frame number received from the selection portion 34 and generates a RSU packet signal to be output during the road-vehicle transmission period. In the meantime, in the following description, the RSU packet signal and the packet signal are used without being distinguished from each other.

Figure 4A:
FIG. 4A is a view showing a structure of a sub-frame in FIGS. 3A-3D
Figure 4B:
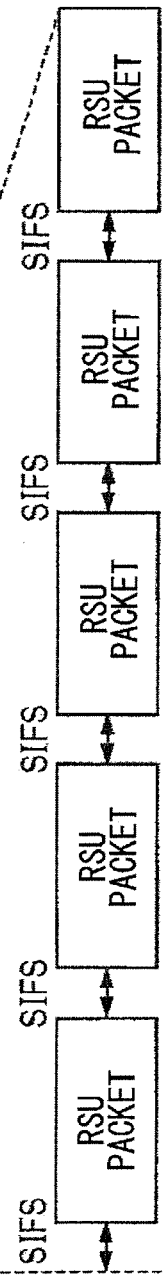
FIG. 4B is a view showing disposition of packet signals in a between-road-and-vehicle transmission period.

FIGS. 4A and 4B show a structure of a sub-frame. FIG. 4A shows a sub-frame in which a road-vehicle transmission period is set. As shown in the figure, one sub-frame is formed in an order from a road-vehicle transmission period to a vehicle-vehicle transmission period.

FIG. 4B shows disposition of packet signals in the road-vehicle transmission period. As shown in the figure, a plurality of RSU packet signals are ranged in the road-vehicle transmission period. Here, the adjacent packet signals are spaced by a SIFS (Short Interframe Space).

Here, a structure of a RSU packet signal is described. FIGS. 5A and 5B show a format of a MAC frame contained in the packet signal that is defined by the communication system 100. FIG. 5A shows the format of the MAC frame. The MAC frame successively disposes, from the header, a "MAC header," a "LLC header," a "message header," "data payload," and a "FCS." Information contained in the "data payload" is described later. FIG. 5B is a view showing a structure of a message header generated by the generation portion 36. The message header contains a base portion.

The base portion includes: a "protocol version," a "transmission node type," a "reuse number," a "TSF timer," a "RSU transmission period length." The protocol version shows a version of a corresponding protocol. The transmission node type shows a sender of the packet signal that contains the MAC frame. For example, "0" shows the terminal device, while "1" shows the base station device 10. In the meantime, in a case where the vehicle terminal device and the mobile terminal device are distinguished from each other, the transmission node type is shown by two bits. In a case where the selection portion 34 extracts, from the input demodulation results, a demodulation result from the other base station device 10, the selection portion 34 uses a value of the transmission node type. The reuse number shows an index of validity in a case where the message header is transferred by the terminal device, and the TSF timer shows a transmission time point. The RSU transmission period length is information related to the road-vehicle transmission period which shows a length of a road-vehicle transmission period. Back to FIG. 2.

The network communication portion 28 is connected to a not-shown network 202. The network communication portion 28 receives jam information from the network 202. The generation portion 36 acquires the jam information from the network communication portion 28 and stores the jam information into the data payload to generate the above RSU packet signal. The control portion 30 controls a process of the entire base station device 10.

It is possible to achieve this structure as hardware by means of a CPU of an arbitrary computer; a memory; and another LSI, and as software by means of a program and the like loaded in the memory; here, function blocks achieved by a combination of them are shown. Accordingly, it is understandable by those skilled in the art that these function blocks are achievable in various forms by the hardware only, the software only, or a combination of them.

Figure 6:
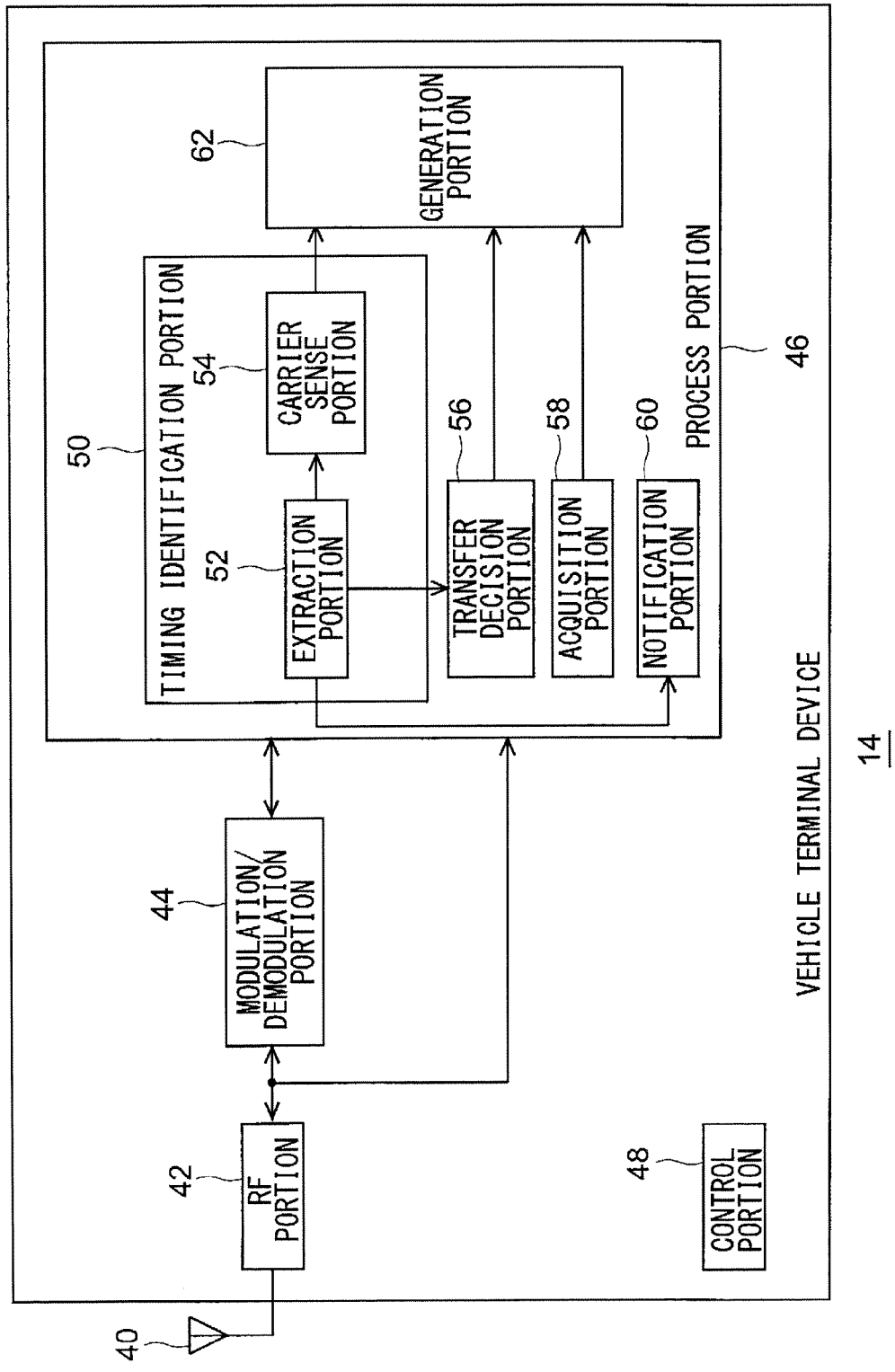
FIG. 6 is a view showing a structure of a vehicle terminal device mounted in a vehicle in FIG. 1.

FIG. 6 shows a structure of a vehicle terminal device 14 mounted in the vehicle 12. The vehicle terminal device 14 includes: an antenna 40; a RF portion 42; a modulation/demodulation portion 44; a process portion 46; and a control portion 48. The process portion 46 includes: a timing identification portion 50; a transfer decision portion 56; an acquisition portion 58; a notification portion 60; and a generation portion 62, and the timing identification portion 50 includes: an extraction portion 52; and a carrier sense portion 54. The antenna 40, the RF portion 42 and the modulation/demodulation portion 44 execute a process similar to the antenna 20, the RF portion 22 and the modulation/demodulation portion 24 in FIG. 2. Because of this, here, difference is mainly described.

The modulation/demodulation portion 44 and the process portion 46 receive the packet signal from the other terminal device (not shown) and the other base station device 10 (not shown). In the meantime, as described above, the modulation/demodulation portion 44 and the process portion 46 receive the packet signal from the base station device 10 during the road-vehicle transmission period. As described above, the modulation/demodulation portion 44 and the process portion 46 receive the packet signal from the other vehicle terminal device 14 during the vehicle-vehicle transmission period. Further, although details are decribed later, the modulation/demodulation portion 44 and the process portion 46 receive the packet signal from the not-shown mobile terminal device irrespective of the road-vehicle transmission period and the vehicle-vehicle transmission period.

In a case where a demodulation result from the modulation/demodulation portion 44 is the packet signal from the not-shown base station device 10, the extraction portion 52 identifies timing of a sub-frame in which the road-vehicle transmission period is disposed. At this time, the extraction portion 52 infers that the base station device 10 is situated in the area 212 of FIG. 1. The extraction portion 52 generates a frame based on the timing of the sub-frame and the content of the message header of the packet signal, specifically, the content of the RSU transmission period length. In the meantime, the generation of the frame may be performed like in the above frame definition portion 32, accordingly, here, description is skipped. As a result of this, the extraction portion 52 generates a frame that synchronizes with the frame formed by the base station device 10.

On the other hand, in a case where the RSU packet signal is not received, the extraction portion 52 infers that the base station device 10 is situated in the area 214 of FIG. 1. In the case where the extraction portion 52 infers that the base station device 10 is situated in the area 214, the extraction portion 52 selects the vehicle-vehicle transmission period. When the extraction portion 52 infers that the base station device 10 is situated outside the area 214, the extraction portion 52 selects timing irrelevant to the frame structure. In the case where the extraction portion 52 selects the vehicle-vehicle transmission period, the extraction portion 52 outputs the timing of the frame and sub-frame and the information related to the vehicle-vehicle transmission period to the carrier sense portion 54. When the extraction portion 52 selects the timing irrelevant to the frame structure, the extraction portion 52 instructs the carrier sense portion 54 to execute carrier sense.

The carrier sense portion 54 receives the timing of the frame and sub-frame and the information related to the vehicle-vehicle transmission period from the extraction portion 52. The carrier sense portion 54 executes carrier sense during the vehicle-vehicle transmission period to measure interference electric power. Besides, the carrier sense portion 54 decides transmission timing during the vehicle-vehicle transmission period based on the interference electric power. Specifically, the carrier sense portion 54 stores beforehand a predetermined threshold value, and compares the interference electric power and the threshold value with each other. The carrier sense portion 54 decides the transmission timing. In a case where the carrier sense portion 54 is instructed to execute the carrier sense by the extraction portion 52, the carrier sense portion 54 executes the CSMA without considering the frame structure to decide the transmission timing. The carrier sense portion 54 notifies the generation portion 62 of the decided transmission timing.

The acquisition portion 58 includes: a GPS receiver, a gyroscope, a vehicle speed sensor and the like that are not shown, and based on data supplied from them, acquires a location, traveling direction, traveling speed and the like (hereinafter, collectively called "location information") of the vehicle terminal device 14. In the meantime, the location is shown by latitude and longitude. A conventional technology may be used to acquire the location information, accordingly, description is skipped. The acquisition portion 58 outputs the location information to the generation portion 62.

The transfer decision portion 56 controls transfer of a message header. The transfer decision portion 56 extracts message headers from the packet signals. In a case where the packet signal is directly transmitted from the base station device 10, the reuse number is set at "0," however, in a case where the packet signal is transmitted from the other vehicle terminal device 14, the reuse number is set at a value of "1 or more." The transfer decision portion 56 selects a message header to be transferred from the extracted message headers. Here, for example, the message header whose reuse number is the smallest is selected. Besides, the transfer decision portion 56 may generate a new message header by synthesizing the contents contained in the plurality of message headers. The transfer decision portion 56 outputs the message header of the selected target to the generation portion 62. At this time, the transfer decision portion 56 augments the reuse number by "1."

The generation portion 62 receives the location information from the acquisition portion 58 and receives the message header from the transfer decision portion 56. The generation portion 62 uses the MAC frame shown in FIGS. 5A and 5B to store the location information into the data payload. The generation portion 62 generates a packet signal which contains the MAC frame, and transmits the generated packet signal in the broadcast manner at the transmission timing decided by the carrier sense portion 54 via the modulation/demodulation portion 44, the RF portion 42 and the antenna 40. This corresponds to the between-vehicles communication. In the meantime, the transmission timing is contained in the vehicle-vehicle transmission period.

The notification portion 60 acquires the packet signal from the not-shown base station device 10 and the packet signal from the not-shown other vehicle terminal device 14 via the extraction portion 52. As a process for the acquired packet signal, the notification portion 60 notifies the driver of approaches and the like of another not-shown vehicle 12 and pedestrian 16 via a monitor and a speaker in accordance with the data content contained in the packet signal. Further, the notification portion 60 notifies the driver of the jam information and the like via the monitor and the speaker.

Figure 7:
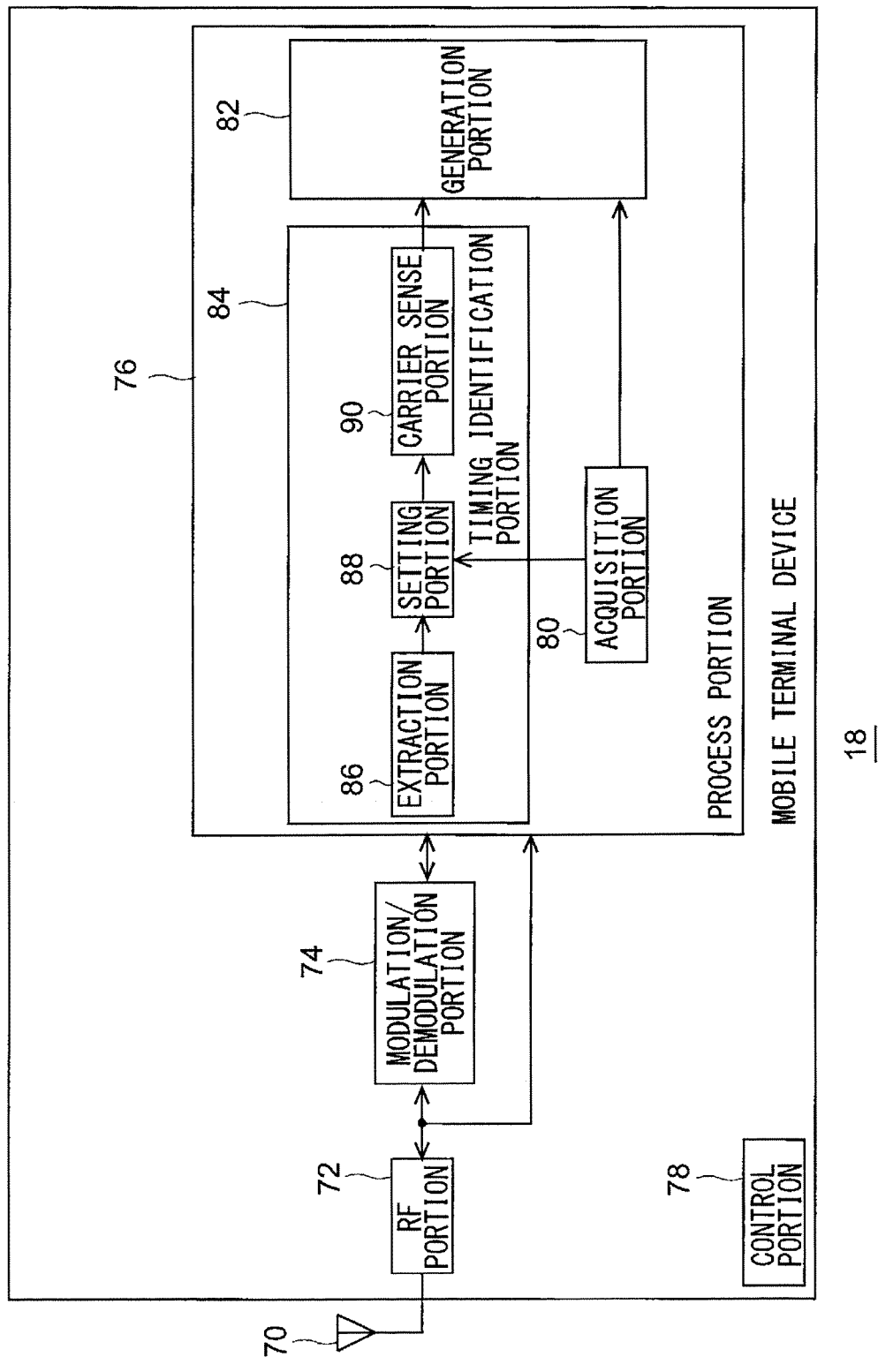
FIG. 7 is a view showing a structure of a mobile terminal device carried by a pedestrian in FIG. 1.

FIG. 7 shows a structure of the mobile terminal device 18 carried by the pedestrian 16. The mobile terminal device 18 includes: an antenna 70; a RF portion 72; a modulation/demodulation portion 74; a process portion 76; and a control portion 78. Besides, the process portion 76 include: an acquisition portion 80; a generation portion 82; and a timing identification portion 84, and the timing identification portion 84 includes: an extraction portion 86; a setting portion 88; and a carrier sense portion 90. The acquisition portion 80 acquires location information like the acquisition portion 58 in FIG. 6. This is a location of the present mobile terminal device 18 and a location of the pedestrian 16. The acquisition portion 80 outputs the location information to the setting portion 88 and the generation portion 82.

The modulation/demodulation portion 74 and the process portion 76 receive the packet signals from the other terminal device (not shown) and the other base station device 10 (not shown) like the modulation/demodulation portion 44 and the process portion 46 in FIG. 6. Especially, the modulation/ demodulation portion 74 and the process portion 76 receive, during the road-vehicle transmission period, the packet signal from the base station device 10, that is, the packet signal containing the information related to the frame structure. Besides, the modulation/demodulation portion 74 and the process portion 76 receive, during the vehicle-vehicle transmission period, the packet signal from the vehicle terminal device 14, that is, the packet signal containing information related to the location information of the vehicle terminal device 14.

In a case where a demodulation result from the modulation/demodulation portion 74 is the packet signal from the not-shown base station device 10, like the extraction portion 52, the extraction portion 86 identifies timing of a sub-frame in which the road-vehicle transmission period is disposed. Besides, the extraction portion 86 identifies the vehicle-vehicle transmission period and outputs the timing of the frame and sub-frame and the information related to the vehicle-vehicle transmission period to the setting portion 88. On the other hand, when the extraction portion 86 selects timing irrelevant to the frame structure, the extraction portion 86 notifies the setting portion 88 that a frame is not defined. Further, the extraction portion 86 extracts the location information from the packet signal that is received from the vehicle terminal device 14. The extraction portion 86 outputs the location information to the setting portion 88.

When the setting portion 88 receives the timing of the frame and sub-frame and the information related to the vehicle-vehicle transmission period from the extraction portion 86, the setting portion 88 sets a waiting time period for carrier sense during the vehicle-vehicle transmission period. Here, as the setting of the waiting time period, preferential transmission and usual transmission are defined. To select either of them, the setting portion 88 calculates the distance between the location acquired by the acquisition portion 80 and the location contained in the packet signal that is received by the reception portion from the extraction portion 86. In a case where the distance is smaller than a threshold value, the setting portion 88 selects the preferential transmission, while in a case where the distance is equal to the threshold value or more, the setting portion 88 selects the usual transmission. This corresponds to selecting the preferential transmission in a case where the location positioned by the acquisition portion 80 meets a predetermined condition.

Figure 8:
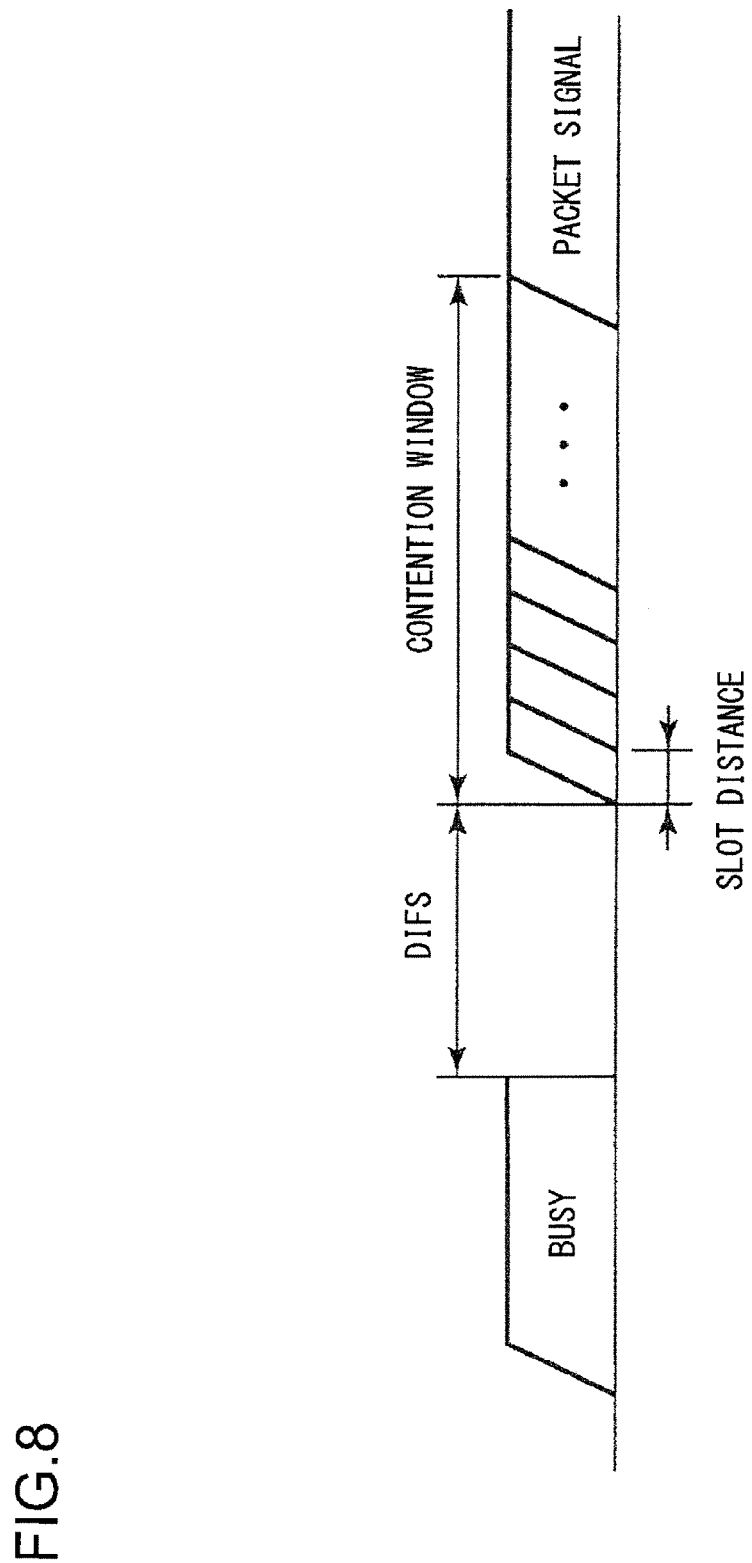
FIG. 8 is a view showing operation of the mobile terminal device in FIG. 7.

Here, an overview of the CSMA operation by means of the carrier sense is described. FIG. 8 shows operation of the mobile terminal device 18. The horizontal axis shows the time. A busy state shows a state in which a signal from another device is received. After the busy state ends, waiting is performed for a Distributed Coordination Function Inter Frame Space, or DIFS (DCF IFS). Further, after the DIFS ends, the waiting is also performed for a contention window. In a case where a signal is not received during this time, a packet signal is transmitted. Here, the contention window is composed of a plurality of slots. The size of a slot is 13 μsec. Besides, the number of slots is defined by random numbers 0 to N in the case where the carrier sense in the vehicle terminal device 14 and the carrier sense in the usual transmission are executed. As described above, in the usual transmission, the contention window is set like in the vehicle terminal device 14.

The length of the packet signal output from the mobile terminal device 18 is shorter than the length of the packet signal output from the vehicle terminal device 14. Because of this, if the period of the contention window is the same in both, the former has a waiting time period for the packet signal length longer than the latter. To deal with this, a random number range, which the carrier sense portion 90 is able to set for the carrier sense, is set to be narrower than a random number range which the vehicle terminal device 14 is able to set for the carrier sense. For example, a random number range able to be set for the carrier sense in the preferential transmission is defined by 0 to N/2. This corresponds to that a waiting time period range, which the vehicle terminal device 14 is able to be set, is shorter than a waiting time period which the mobile terminal device 18 is able to set. Besides, the maximum value of the waiting time period, which the setting portion 88 is able to set, is smaller than the maximum value of the waiting time period which the vehicle terminal device 14 is able to set for the carrier sense. Here, by decreasing the maximum value of the contention window in the preferential transmission only, influence on the vehicle terminal device 14 is reduced. Back to FIG. 7.

In the meantime, in the case where the setting portion 88 notifies that a frame is not defined, likewise, the setting portion 88 sets likewise a contention window irrespective of the frame structure. The carrier sense portion 90 executes the carrier sense for the waiting time period set by the setting portion 88. The modulation/demodulation portion 74 and the RF portion 72 output a packet signal based on the result of the carrier sense by the carrier sense portion 90.

Figure 9:
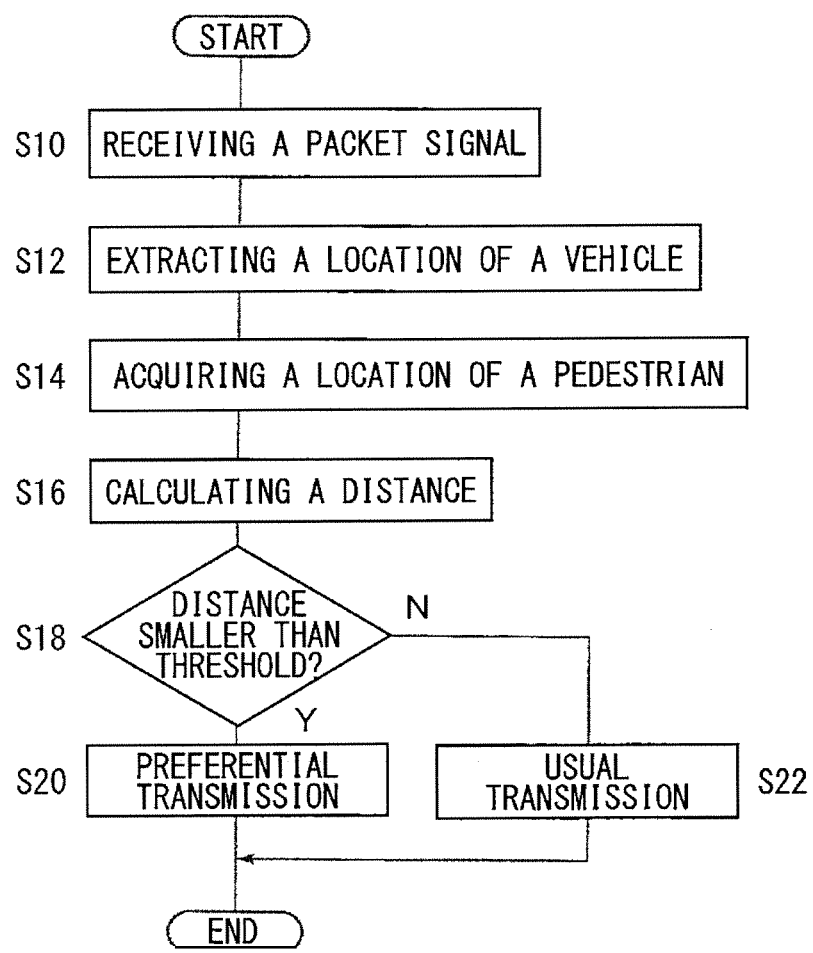
FIG. 9 is a flow chart showing a transmission procedure in the mobile terminal device in FIG. 7.

Operation of the communication system 100 having the above structure is described. FIG. 9 is a flow chart showing a transmission procedure in the mobile terminal device 18. The modulation/demodulation portion 74 and the process portion 76 receive a packet signal (S10). The extraction portion 86 extracts location information of the vehicle 12 (S12). The acquisition portion 80 acquires a location of the pedestrian 16 (S14). The setting portion 88 calculates the distance between the vehicle 12 and the pedestrian 16 (S16). If the distance is smaller than the threshold (Y in S18), the setting portion 88 selects the preferential transmission (S20). On the other hand, if the distance is not smaller than the threshold (N in S18), the setting portion 88 selects the usual transmission (S22).

Next, a modification of the present invention is described. The modification of the present invention, like the embodiments, relates to a mobile terminal device carried by a pedestrian. In the embodiments, based on the distance between the vehicle and the pedestrian, the execution of the preferential transmission is decided. On the other hand, in the modification, based on an area where the pedestrian is situated, the execution of the preferential transmission is decided. For example, in a case where the pedestrian is walking on a vehicle road or a road side zone, the execution of the preferential transmission is decided. The communication system 100, base station device 10, and vehicle terminal device 14 according to the modification are of the type similar to FIG. 1, FIG. 2 and FIG. 6. Here, difference is mainly described.

Figure 10:
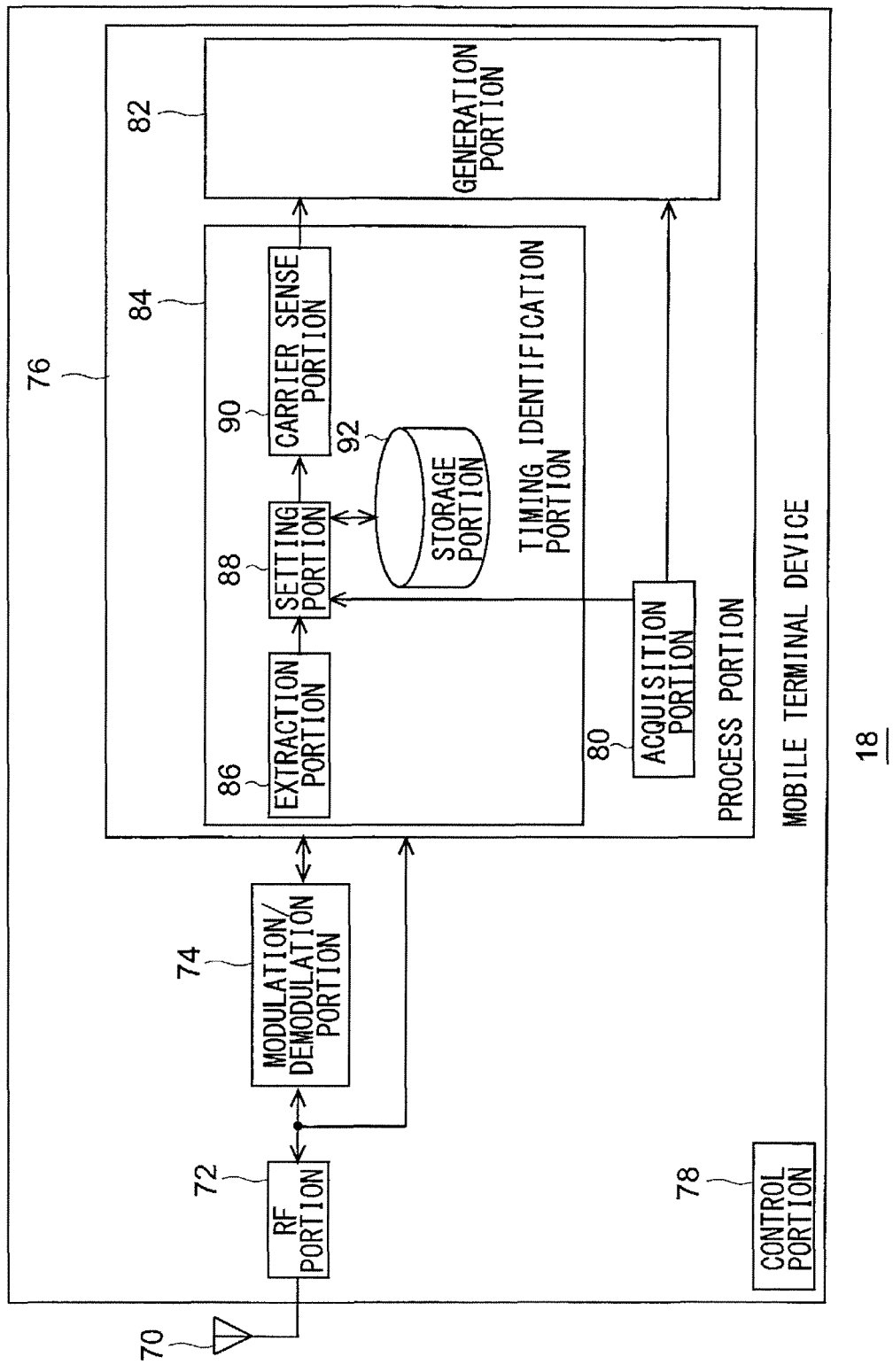
FIG. 10 is a view showing a structure of a mobile terminal device according to a modification of the present invention.

FIG. 10 shows a structure of the mobile terminal device 18 according to the modification of the present invention. A storage portion 92 is added to the mobile terminal device 18 shown in FIG. 7. The storage portion 92 stores location information of a predetermined area. As described above, the predetermined area is a vehicle road or a road side zone where a risk of a collision with the vehicle 12 is high. Such location information also is shown by latitude and longitude. In a case where the location positioned by the acquisition portion 80 is covered by the area stored in the storage portion 92, the setting portion 88 selects the preferential transmission. On the other hand, in a case where the location positioned by the acquisition portion 80 is not covered by the area stored in the storage portion 92, the setting portion 88 selects the usual transmission.

Figure 11:
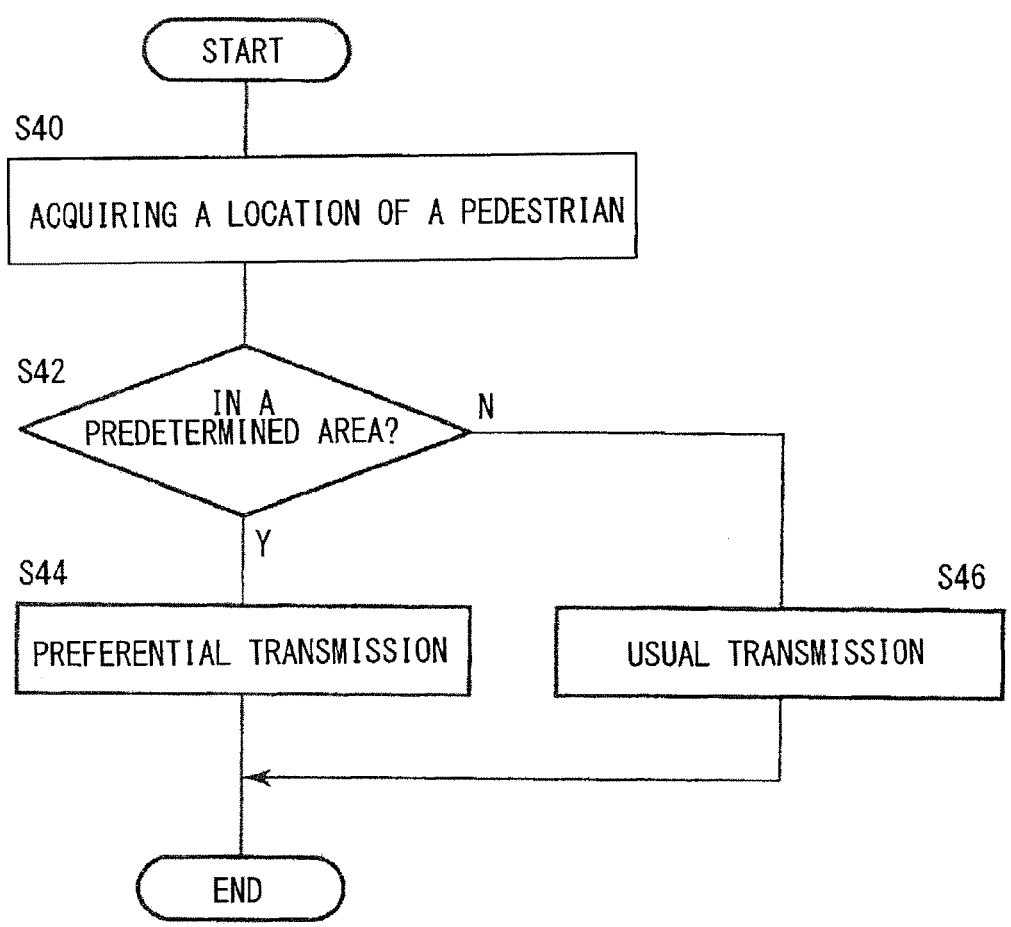
FIG. 11 is a flow chart showing a transmission procedure in the mobile terminal device in FIG. 10.

Operation of the communication system 100 having the above structure is described. FIG. 11 is a flow chart showing a transmission procedure in the mobile terminal device 18. The acquisition portion 80 acquires a location of the pedestrian 16 (S40). In a case where the acquired location is in the predetermined area (Y in S42), the setting portion 88 selects the preferential transmission (S44). On the other hand, in a case where the acquired location is not in the predetermined area (N in S42), the setting portion 88 selects the usual transmission (S46).

According to the embodiments of the present invention, the carrier sense is executed during the vehicle-vehicle transmission period identified by the frame information that is output from the base terminal device, accordingly, even in the case where the packet signal is output from mobile terminal device, it is possible to reduce the influence given to the packet signal that is output from the vehicle terminal device. Besides, when a predetermined condition is met, the waiting time period range is set to be narrower than the waiting time period range of the vehicle terminal device, accordingly, it is possible to preferentially transmit the packet signal during a shorter waiting time period. Besides, it becomes easy to transmit the packet signal during the shorter waiting time period, accordingly, it is possible to quickly output the location. Besides, the preferential transmission is executed only when the predetermined condition is met, accordingly, it is possible to alleviate a reduction in the transmission opportunity of the vehicle terminal device. Besides, the preferential transmission is executed only when the predetermined condition is met, accordingly, it is possible to identify the timing for preferentially outputting the packet signal while reducing the influence given to the packet signal output from the vehicle terminal device.

Besides, transmission electric power for the packet signal output from the mobile terminal device is set to be smaller than transmission electric power for the packet signal output from the base station device and the vehicle terminal device, accordingly, it is possible to reduce the influence given to the latter. Besides, the transmission electric power is set to be small, accordingly, it is possible to reduce electric power consumption. Besides, the electric power consumption is reduced, accordingly, it is possible to prolong the drive time period. Besides, when a vehicle approaches, the preferential transmission is executed, accordingly, it is possible to perform a notification about the location when the risk of a collision is high. Besides, when entering an area where the risk is high, the preferential transmission is executed, accordingly, it is possible to perform a notification about the location when the risk of a collision is high.

Hereinbefore, the description is performed based on the embodiments. These embodiments are mere examples, and it is understandable to those skilled in the art that various modifications are possible in a combination of all the constituent components of them and various treatment processes; and such modifications also are in the scope of the present invention.

In the embodiments of the present invention, in the preferential transmission, the maximum value of the waiting time period, which the mobile terminal device 18 is able to set, is set to be smaller than the maximum value of the waiting time period which the vehicle terminal device 14 is able to set for the carrier sense. However, this is not limiting, and the waiting time period range which the setting portion 88 is able to set may be deviated from the waiting time period range which the vehicle terminal device 14 is able to set for the carrier sense. In an example, the contention window by the setting portion 88 is defined from "0" to "15," while the contention window by the vehicle terminal device 14 is defined from "16" to "63." According to the present modification, the waiting time period is deviated, accordingly, it is possible to reduce the collision likelihood of the packet signal.

In the embodiments of the present invention, in the preferential transmission, the maximum value of the waiting time period, which the mobile terminal device 18 is able to set, is set to be smaller than the maximum value of the waiting time period which the vehicle terminal device 14 is able to set for the carrier sense. However, this is not limiting, and the waiting time period, which the mobile terminal device 18 is able to set, may be a fixed value, while the waiting time period, which the vehicle terminal device 14 is able to set for the carrier sense, may be a variable value. In an example, the setting portion 88 sets the SIFS and the like. According to the present modification, it is possible to preferentially output the packet signal from the mobile terminal device 18.

In the embodiments of the present invention, the setting portion 88 selects the execution of the preferential transmission or the usual transmission based on the location acquired by the acquisition portion 80. However, this is not limiting, and the mobile terminal device 18 may be provided with a button, and if the setting portion 88 detects that the button is pushed down by a pedestrian, the setting portion 88 may select the preferential transmission. Further, if a predetermined time period passes after the button is pushed down, the setting portion 88 may select the usual transmission. According to the present modification, it is possible to execute the preferential transmission according to intention of the pedestrian.

REFERENCE SIGNS LIST 10 base station device
12 vehicle
14 vehicle terminal device
16 pedestrian
18 mobile terminal device
20 antenna
22 RF portion
24 modulation/demodulation portion
26 process portion
28 network communication portion
30 control portion
32 frame definition portion
34 selection portion
36 generation portion
40 antenna
42 RF portion
44 modulation/demodulation portion
46 process portion
48 control portion
50 timing identification portion
52 extraction portion
54 carrier sense portion
56 transfer decision portion
58 acquisition portion
60 notification portion
62 generation portion
70 antenna
72 RF portion
74 modulation/demodulation portion
76 process portion
78 control portion
80 acquisition portion
82 generation portion
84 timing identification portion
86 extraction portion
88 setting portion

90 carrier sense portion
100 communication system

The invention claimed is:

1. A terminal device comprising:
   a positioning portion that acquires a location of an object;
   a setting portion that sets a waiting time period in a case where the location acquired by the positioning portion meets a predetermined condition;
   a carrier sense portion that performs carrier sensing for the waiting time period set by the setting portion; and
   an output portion that outputs a packet signal based on a result of the carrier sensing performed by the carrier sense portion, wherein
   a range of the waiting time period which the setting portion is able to set is narrower than a range of a waiting time period that another terminal device, which is able to perform carrier sensing to output a packet signal, is able to set.

2. The terminal device according to claim 1, further comprising:
   a reception portion that receives, from the another terminal device, a packet signal that contains information related to a location of the another terminal device, wherein in a case where a distance between the location acquired by the positioning portion and the location contained in the packet signal received by the reception portion is smaller than a threshold value, the setting portion sets the waiting time period.

3. The terminal device according to claim 1, wherein in a case where the location acquired by the positioning portion is situated in a predetermined area, the setting portion sets the waiting time period.

4. The terminal device according to claim 1, wherein a maximum value of the waiting time period that the setting portion is able to set is smaller than a maximum value of the waiting time period that the another terminal device is able to set.

5. The terminal device according to claim 1, wherein the range of the waiting time period that the setting portion is able to set does not overlap the range of the waiting time period that the another terminal device is able to set.

6. The terminal device according to claim 1, wherein the waiting time period that the setting portion is able to set is a fixed value, and the waiting time period that the another terminal device is able to set is a variable value.

* * * * *